Patented Nov. 9, 1943

2,333,718

UNITED STATES PATENT OFFICE 2,333,718

PROCESS OF PREPARING CAMPHORIC ACID

Paul Heisel, Gersthofen, near Augsburg, Germany; vested in the Alien Property Custodian No Drawing. Application March 25, 1941, Serial No. 385,135. In Germany March 12, 1940

4 Claims. (Cl. 260—514)

The present invention relates to a process of preparing camphoric acid.

Various processes are already known for preparing camphoric acid by oxidizing camphor with nitric acid. There are obtained such inferior yields according to the hitherto known methods that it has up to now been impossible to prepare camphoric acid on an industrial scale.

Now I have found that camphoric acid may be prepared on any desired industrial scale by oxidizing camphor with nitric acid in the presence of mercury or mercury salts at ordinary or a raised pressure. Instead of camphor which may be introduced in an optically active or a racemic form there may be used with the same good success the alcohols being the basis for camphor, or borneol, isoborneol or the mixtures thereof; furthermore bornyl chloride as well as mixtures of camphor with the said compounds.

I have furthermore found that by the presence of iron in the nitric acid containing mercury the reaction is promoted so that a further increase in the yield is attained.

The nitric acid may preferably be used in a concentration of about 45 to about 60 per cent strength. Care may be taken for maintaining said concentration during the entire course of the operation. A decrease to about 40 per cent, however, makes itself not yet noticeable in a disagreeable manner. The mercury may be used as a metal or in the form of a mercury salt soluble under the conditions of the reaction, for instance of the nitrate, chloride, carbonate or sulfate. In order to obtain camphoric acid in substantially quantitative yields, it is necessary to apply at least about 25 grams of mercury (metallic or in the form of its salt) per liter of nitric acid. Concentrations higher than 100 grams of mercury per liter of nitric acid are, however, unnecessary for the production of substantially quantitative yields. There may best be taken care that the mercury may be used in a concentration of 30 grams to 40 grams per liter of nitric acid.

The iron may be introduced into the reaction in the form of a metal or a salt, for instance as a nitrate, a chloride, a carbonate or a sulfate. A quantity of less than 15 grams of iron per liter of nitric acid will suffice for increasing the yield in each case by up to 5 per cent above the yield which would have been obtained only with nitric acid containing mercury, but in the absence of iron. It may be suitable to apply the iron (metallic or in the form of its salts) in a quantity of not less than 1 gram per liter of nitric acid.

The reaction may be performed at a temperature below 100° C., for instance at a temperature of 70° C. to 80° C. In order to increase the velocity of the reaction, it is also possible to operate at a temperature above 100 C., for instance at 110° C. or at 125° C. During the reaction there must be thoroughly stirred. At a temperature between 70° C. and 80° C. the oxidation is complete in at most 60 hours, whereas at 110° C. the oxidation period amounts to about 10 hours. After cooling, the camphoric acid is isolated by filtering it by suction or by centrifuging it, washed and dried suitably under reduced pressure. Its melting point then corresponds without any further purification steps with that of the pure substance.

In comparison with the known steps, the new process involves not only an extraordinary increase in the yield up to substantially the limit of the theoretically possible yield, but moreover the essential industrial progress that the volumes of the vessels are considerably reduced; this advantage is of special importance when there is operated with hot, concentrated nitric acid owing to the high costs of the building materials used. Whereas, for instance, according to former processes about 25 parts of nitric acid of 50 per cent strength had been required for preparing 1 part of camphoric acid, it is possible, according to the new process, to prepare 1 part of camphoric acid in about the same unit of time while using only 6 parts of nitric acid of about 50 per cent strength and moreover in a fraction of the time formerly required.

After the isolation of the camphoric acid the mother liquor is returned into the process after it has been brought, if required, to its former concentration. The losses of catalyst are immaterial, the more so if the washing waters are evaporated under reduced pressure and the residue on evaporation is added to the main mother liquor.

The following examples serve to illustrate the invention, but they are not intended to limit it thereto:

1. 60 grams of mercury and 10 grams of iron are dissolved in 1700 cc. of nitric acid, density =1.35; 305 grams of racemic camphor are introduced into the solution. The whole is heated, while stirring, for 24 hours to 75° C. and then for 36 hours to 80° C. After cooling, the camphoric acid which has separated is centrifuged and then washed with water. By evaporation of the washing water under reduced pressure the camphoric acid dissolved therein may be obtained. The acid is dried under reduced pressure. It is of a pure white color; its melting point is at 202° C. The yield amounts to 92 per cent of the theoretical yield. If there is operated under otherwise the same conditions, but in the absence of iron, the yield of camphoric acid amounts 87–88 per cent of the theoretical yield. By using, instead of camphor, 308 grams of a mixture of iso-borneol and borneol, as it is industrially readily accessible from oil of turpertine, the camphoric acid is obtained in the same good yield.

By introducing 304 grams of d-camphor instead of the racemic camphor, d-camphoric acid melting at a temperature of 186° C.–187° C. is obtained in the same yield.

2. The apparatus used for the oxidation consists of a ground top flask of a capacity of 5 liters and provided with a ground top Claisen headpiece and two top ground ball condensers which are fed with water. Heating is carried out in an oil bath and care is taken for a good stirring.

A solution for the oxidation is prepared by dissolving 80 grams of mercury and 5 grams of iron powder in 2 liters of nitric acid of 55 per cent strength. 304 grams of camphor are then added and the contents of the flask are kept for 5 hours at 100° C., while well stirring and cooling in a reflux condenser; the temperature is then raised to 110° C. and stirring is continued at that temperature for further 5 hours. The oxidation is then complete. The mixture is first cooled with water during which operation the main portion of the camphoric acid is separated; it is then cooled with ice and finally with a freezing mixture of ice so that the separation of the acid is complete in about 7 to 9 hours, calculated from the moment when the apparatus is stopped. The camphoric acid which has separated is then centrifuged, washed and dried in the course of some hours at 70° C. under reduced pressure.

The washing water is concentrated until a specific gravity of about 1.35 is attained and the concentrated liquid is united with the main mother liquor so that any losses of the catalyst are avoided. The solution is filled up with nitric acid of 98–100 per cent strength so as to obtain 2 liters. For the following operation the solution must have the specific gravity of $d_{15}=1.355$ and contain in two liters the portions of catalyst named above. 304 grams of camphor are again added and the new batch is oxidized as described above. Any losses of the catalyst have, if required, to be filled up before the next operation is started.

According to the afore-described method of operating the yield amounts to 77–79 per cent of the theoretical yield.

I claim:

1. In the process of preparing camphoric acid the steps which comprise oxidizing with nitric acid a compound of the group consisting of camphor, borneol, isoborneol and bornyl chloride and mixtures of said compounds in the presence of a substance of the group consisting of mercury and mercury salts.

2. In the process of preparing camphoric acid the steps which comprise oxidizing with nitric acid a compound of the group consisting of camphor, borneol, isoborneol and bornyl chloride and mixtures of said compounds in the presence of a substance of the group consisting of mercury and mercury salts and of a substance of the group consisting of iron and iron salts.

3. The process as claimed in claim 1 wherein the oxidation is carried out with a nitric acid of about 45 per cent. strength to about 60 per cent. strength in the presence of about 25 grams to about 40 grams of mercury per liter of nitric acid.

4. The process as claimed in claim 2 wherein the oxidation is carried out with a nitric acid of about 45 per cent. strength to about 60 per cent. strength in the presence of about 25 grams to about 40 grams of mercury and about 1 gram to about 15 grams of iron per liter of nitric acid.

PAUL HEISEL.